Sept. 22, 1970 G. H. TOWNEND 3,529,467
APPARATUS FOR MEASURING THE HARDNESS OF MATERIALS
Filed Aug. 5, 1968 2 Sheets-Sheet 1

INVENTOR:
Gordon Howard Townend
BY Spencer & Kaye
Attorneys

United States Patent Office 3,529,467
Patented Sept. 22, 1970

3,529,467
APPARATUS FOR MEASURING THE HARDNESS OF MATERIALS
Gordon Howard Townend, Wolverhampton, England, assignor to G.K.N. Group Services Limited, Smethwick, Warley, England, a British company
Filed Aug. 5, 1968, Ser. No. 750,061
Claims priority, application Great Britain, Aug. 4, 1967, 35,906/67
Int. Cl. G01n 3/42
U.S. Cl. 73—82
6 Claims

ABSTRACT OF THE DISCLOSURE

Hardness testing apparatus including a testing head wherein an assembly comprising an indenter tip, a mass, and a stress responsive electrical element interposed therebetween, is carried by a pair of parallel blade springs. A lever is arranged to engage one of said blade springs and is operable to move said assembly to stress said springs, latching means being provided to hold said assembly in a position in which the springs are stressed to a predetermined extent. Means are provided for manually releasing said latching means so that said assembly has a predetermined velocity imparted thereto as it moves under the influence and guidance of said blade springs. Impact of said indenter tip on the material under test causes an electrical hardness signal to be generated during the period in which an arresting force is exerted on the tip due to its penetration into the material.

BACKGROUND OF THE INVENTION

Field of the invention

This invention relates to apparatus for measuring the hardness of materials and is a modification of the apparatus described and claimed in patent application Ser. No. 477,187, now Patent No. 3,421,364 filed Aug. 4, 1965 by H. K. Moneypenny and R. Kitchener.

Summary of the prior art

In said pending patent application there is described and claimed an apparatus for measuring the hardness of a material comprising an indenter tip, an energy source for supplying a predetermined quantum of kinetic energy to the tip for moving the tip to penetrate the material under examination, the resistance of which to such penetration brings the tip to rest, and a transducer operatively associated with the tip in a manner such as to generate an electrical signal representative of the arresting force exerted on the tip by the material, the transducer being stationary with respect to the tip during the period in which the arresting force is measured.

In the specific embodiment of hardness testing apparatus described therein, an assembly comprising the indenter tip, a mass to which a predetermined velocity is imparted by the energy source, and a stress responsive electrical element is movable along a guide way under the influence of spring means.

Whilst this arrangement is generally satisfactory it is important that any frictional resistance to movement of the assembly should be kept to a minimum and should also be constant. Under some conditions of use it is possible that the guideway may be subject to the ingress of moisture or particles of grit or other foreign matter, the presence of which in the guideway would affect the frictional resistance to movement of the assembly along the guideway. It will be appreciated that this in turn would affect the value of hardness as determined by the apparatus since any change in frictional resistance to the movement of the assembly would result in a change in the velocity of the assembly as the tip comes into contact with the material under test.

SUMMARY OF THE INVENTION

The object of the present invention is to provide a modified hardness testing apparatus in which the above mentioned difficulty is avoided.

According to the invention we provide apparatus for measuring the hardness of a material comprising an indenter tip, an energy source for supplying a predetermined quantum of kinetic energy to the tip for moving the tip to penetrate the material under examination, the resistance of which to such penetration brings the tip to rest, and an element operatively associated with the tip in a manner such as to generate a hardness signal representative of the arresting force exerted on the tip by the material, wherein the energy source comprises spring means which serves to impart said predetermined velocity to said indenter tip and also serves as a guide means which constrains said indenter tip to movement along a predetermined path.

Preferably said spring means comprises a pair of generally parallel blade springs secured at adjacent ends in a testing head and latching means are provided for releasably holding said springs in a condition in which they are stressed to a predetermined extent, said springs carrying at their other ends an assembly comprising the indenter tip, a mass to which a predetermined velocity is imparted by said springs when released from said stressed condition, and a stress responsive electrical element interposed between said indenter and said mass so that said element is subjected to at least a portion of the arresting force exerted upon the indenter tip by the material undergoing indentation.

It will be appreciated that with this arrangement the movable assembly is supported and guided entirely by the blade springs and frictional contact with the guideway is eliminated.

The blade springs form a parallel linkage system carrying said assembly and preferably the effective length of the blade springs is significantly greater than the spacing between them so that the assembly is constrained by the blade springs to move in a substantially straight line.

The testing head may include an aperture through which the indenter tip projects only slightly when the blade spring are in an unstressed condition, loading means being provided to withdraw said indenter tip into the testing head and simultaneously load the blade springs to said predetermined stressed condition, and hold said springs in said stressed condition until released.

As explained in our previously mentioned patent, the apparatus applies a hardness test which is of the Vickers, Brinell or Rockwell type (depending upon the particular type of indenter tip used) but instead of actually measuring a physical dimension of the indentation which is produced by plastic deformation of the material as a result of the impact of the indenter tip, the actual arresting force exerted on the indenter tip is measured during the course of the indentation of the material.

The theory establishing the relation between the hardness of the material under test and the arresting force exerted on the indenter tip during plastic deformation of the material is summarised in our said patent.

Since no measurements are required to be taken from the indentation produced by the apparatus, the size of such indentation can be much smaller than has previously been possible in the Vickers, Brinell or Rockwell hardness tests. The formation of a permanent indentation in the material is not avoided with the present apparatus

BRIEF DESCRIPTION OF THE DRAWINGS

The invention will now be described by way of example with reference to the accompanying drawings wherein.

DESCRIPTION OF THE PREFERRED EMBODIMENT

Figure 1:
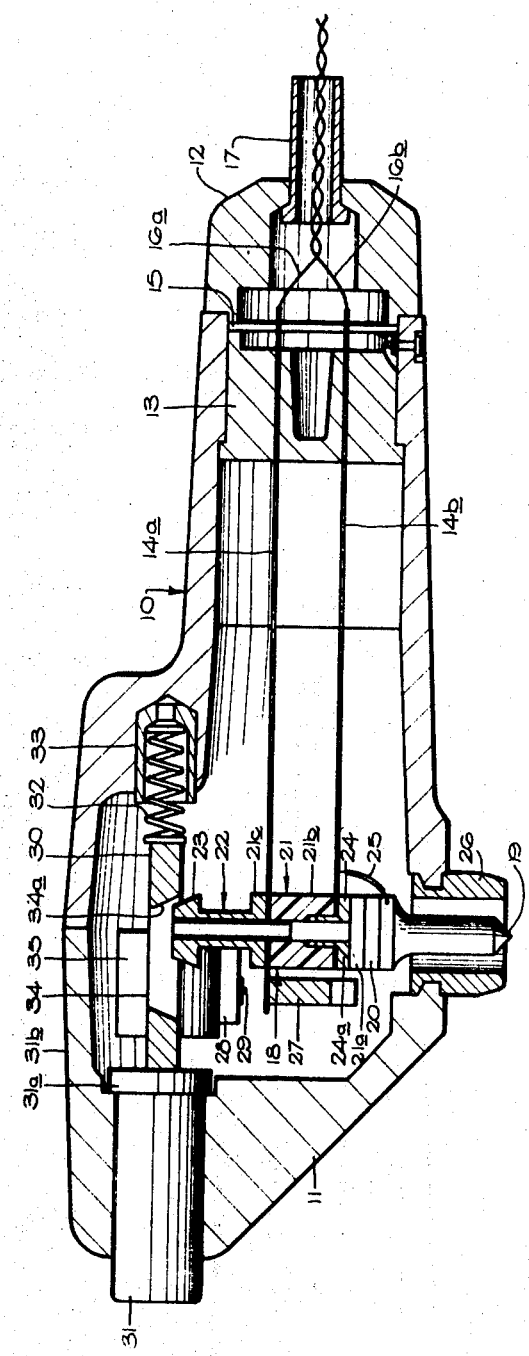
FIG. 1 shows a longitudinal section through a testing head in accordance with the invention.
Figure 2:
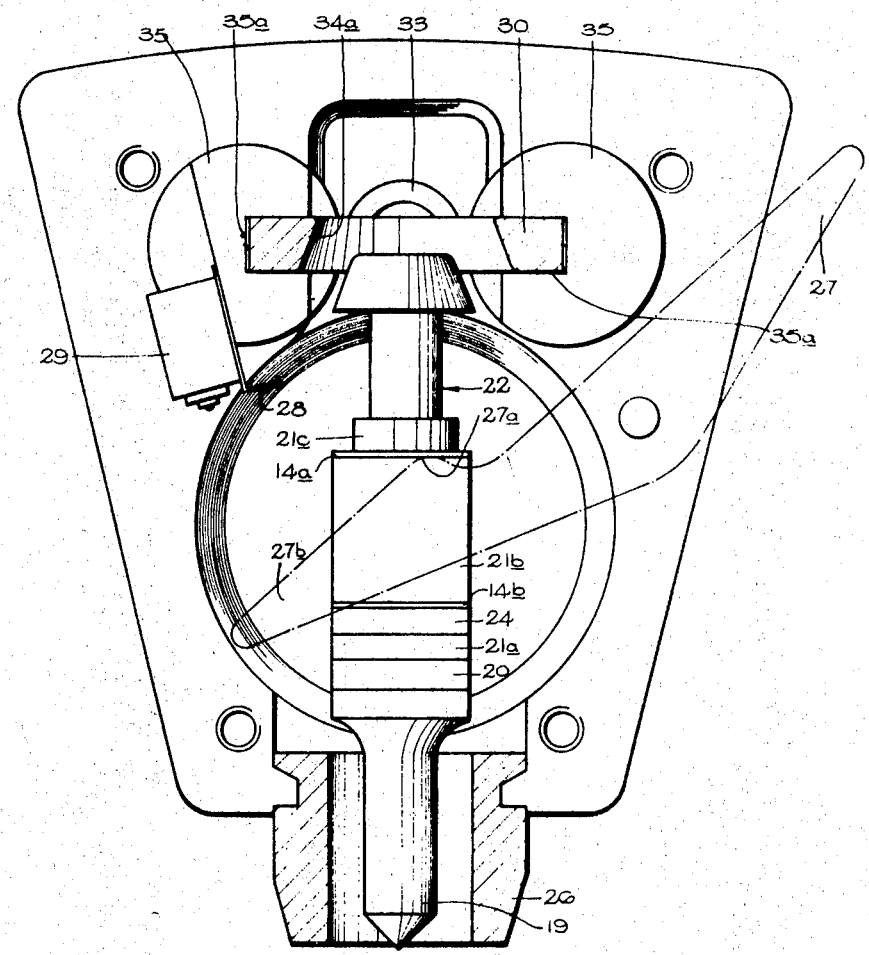
FIG. 2 shows the head in front elevation with a cover removed.

The testing head comprises a generally cylindrical hollow body 10 which is closed at the forward end by a cover member 11 and at the rearward end by a closure cap 12. Adjacent to the closure cap 12 the body 10 contains a moulded mounting block 13 of an electrically insulating plastics material such as a filled resinous material. The ends of a pair of blade springs 14a and 14b are moulded into the block 13. The blade springs extend slightly beyond the block 13 and the free ends are located in an insulating rigid disc 15. Electrical conductors 16a and 16b are connected to the respective blade springs 14a and 14b and extend outwardly from the head through a sleeve 17 received in an aperture in the closure cap.

At their forward ends the blade springs 14a and 14b carry an assembly 18 which comprises an indenter tip 19, a piezo-electric element 20 and a mass 21 formed as three components 21a, b and c. The components of the mass 21 include a bolt-like member 21a to the head of which the piezo-electric element 20 is secured adhesively. The component 21b is a cylindrical element which is received on the shank of the bolt-like member 21a and the component 21c comprises a latching element formed with an annular groove 22 and a frusto-conical upper surface 23. The shank of the bolt-like member 21a passes through aligned apertures adjacent to the outer ends of the two blade springs and the latching element 21c is threadedly engaged with the shank so that the blade springs are clamped between the three components of the mass 21. An insulating washer with a sleeve like extension 24a is located between the blade spring 14b and the bolt-like member 21a, and the cylindrical element 21b is either made of insulating material or is itself insulated from the upper side of the lower blade spring 14b by a suitable washer.

The indenter tip 19, the bolt-like member 21a and the latching element 21c are all made of electrically conducting material. Thus the upper blade spring 14a is in electrical contact with the upper side of the piezo-electric element 20. The lower blade spring 14a is electrically insulated from the upper side of the piezo-electric element by virtue of the insulating disc 24 and the insulating (or insulated) cylindrical element 21b, and is placed in electrical connection with the lower side of the piezo-electric element 20 by means of an insulated wire 25 which is secured at one end to the blade spring 14b and at the other end to the indenter tip 19. It will thus be apparent that any potential difference generated across the piezo-electric element can be applied to a measuring instrument by way of the blade springs and the conductors 16a and 16b connected thereto.

As shown in the accompanying drawings the blade springs 14a and 14b are in their normal unstressed condition and the indenter tip just protrudes beyond the end of a housing 26 which projects downwardly from the body 10. In order to load the blade springs 14a and 14b to a predetermined stressed condition a laterally projecting lever 27 is provided. This is pivotably mounted on the forward end of the body at one side thereof and protrudes laterally therefrom. A rounded cam-like nose 27a engages under the forward end of the upper blade spring 14a, the latter being slightly longer than the lower blade spring 14b for this purpose. However, it will be understood that the two blade springs are effective equal length since their effective lengths are determined by the positions at which they are clamped. When the lever 27 is depressed the nose 27a lifts the assembly 18 and so stresses the blade springs. The frusto-conical upper surface 23 of the latching element 21c then resets a releasing device (as hereinafter described in more detail) which holds the assembly 18 in a raised position, in which the springs 14a and 14b are stressed to a predetermined extent, when the lever 27 is released. The lever 27 has an extension 27b which limits movement of the lever 27 in the spring lifting direction by engagement with an abutment member 28. A micro-switch 29 is mounted in the head next to the abutment member 28 and serve to reset a peak reading voltmeter to which the conductors 16a and 16b are connected.

The releasing device previously mentioned comprises a plate 30 which is secured to an electrically insulating operating button 31 which projects through the cover member 11 at the forward end of the body. A spring 32 is located within an electrically insulating bushing 33 received in the body and engages the rearward end of the plate 30 to bias the latter and the operating button 31 outwardly with respect to the cover member 11. The plate 30 is formed with an aperture 34 which flairs outwardly and downwardly to define a frusto-conical surface 34a. A collar 31a at the rearward end of the operating button 31 engages within an annular recess in the cover member 11 at the inner side thereof to limit the forward movement of the plate 30. The arrangement is such that when the assembly 18 is in its normal position, as shown, there is a slight clearance between the frusto-conical upper surface 23 of the latching element 21c and the internal frusto-conical surface 34a afforded by the aperture 34.

When the lever 27 is operated to lift the assembly 18 the plate 30 is retracted against the force of the spring 32 due to the frusto-conical surface 23 of the latching element 21c riding over the internal frusto-conical surface 34a. When the assembly 18 has been raised sufficiently the frusto-conical surface 23 of the latching element 21c clears the aperture 34 in the plate 30 and the spring 32 presses the plate forwardly until the edge of the aperture 34 contacts the reduced diameter portion of the latching element 21c which forms the bottom of the groove 22. When the lever 27 reaches the limit of its travel the microswitch 29 is operated to reset the measuring device. When the lever 27 is released it may return to its initial position either gravitationally or under the influence of a torsion spring (not shown). Such return of the lever 27 to its initial position allows the assembly 18 to drop slightly until the upper edge of the channel 22 in the latching element 21c engages the upper face of the plate 30 adjacent to the aperture 34. The springs 14a and 14b are then stressed to a predetermined extent.

To carry out a hardness test the housing 26 is laid on the surface of the material to be tested and the operating button 31 is depressed. This causes the plate 30 to move inwardly sufficiently to disengage it from the latching element 21c with the result that the assembly 18 is released and the indenter tip 19 strikes the material under test with a predetermined velocity. This causes an electric potential to be generated across the faces of the piezo-electric element 20, and this potential is measured by the peak reading volt meter previously mentioned.

To ensure that the springs are always stressed to the same extent when the latching element 21c is held by the plate 30, the edges of the latter are located in grooves 35a formed in a pair of electrically insulating cylindrical bushes 35 carried at the forward end of the body, these bushes thereby serving as guide means which accurately locate the plate 30.

The indenter tip may comprise a single element as shown in FIG. 1 adhesively secured to the piezo-electric element 20. Alternatively the indenter tip may be made in two parts. In this case the upper part would be secured adhesively to the piezo-electric element 20 as before but the lower part would be screwed onto the upper part by means of a screw-threaded stem which may be formed on either part. This arrangement enables interchangeable parts to be supplied to provide different shaped indenter tips.

I claim:
1. In apparatus for measuring the hardness of material including,
  (a) a testing head,
  (b) indenter means for penetrating said material,
  (c) driving means for supplying a predetermined quantum of kinetic energy to said indenter means to cause the latter to penetrate said material by virtue of such kinetic energy whereby said material is subjected to plastic deformation and said indenter means is subjected to an arresting force, said driving means comprising an energy source and a mass to which a predetermined velocity is imparted by said energy source,
  (d) generator means including a transducer responsive to said arresting force to generate an electrical signal representative of the hardness of said material, said transducer being stationary with respect to said indenter means during the period in which said arresting force is measured, and
  (e) measuring means for measuring said signal,
the improvement wherein,
  (f) said generator means comprises a stress response electrical element interposed between said indenter means and said mass and forming therewith a movable assembly to which said predetermined velocity is imparted, and
  (g) said energy source comprises a pair of generally parallel blade springs secured at one pair of adjacent ends thereof in said testing head and carrying said assembly at the other pair of adjacent ends, said blade sprnigs constraining said assembly to movement along a predetermined path, said assembly being supported entirely by said blade springs.

2. Apparatus as claimed in claim 1 further comprising,
  (a) latching means for releasably holding said springs in a condition in which they are stressed to a predetermined extent,
  (b) an apertured housing through which said indenter means project only slightly when the blade springs are in an unstressed condition, and
  (c) loading means for withdrawing said indenter means into said testing head and simultaneously loading said blade springs to said predetermined stressed condition.

3. Apparatus as claimed in claim 2 wherein said loading means comprises a lever engageable under one of said blade springs adjacent to said assembly, and said latching means comprises a latching element forming part of said assembly and a manually releasable holding means for engaging said latching element and holding said assembly in a position in which said blade springs are stressed to said predetermined extent.

4. Apparatus as claimed in claim 3 wherein said releasable holding means comprises guides extending transversely to said predetermined path along which said assembly is movable, and a plate slidably mounted in said guides.

5. Apparatus as claimed in claim 1 wherein said mass comprises a bolt-like member having a shank, a cylindrical element received upon the shank of said bolt-like member, and a threaded member also received upon the shank of said bolt-like member, said two blade springs being spaced apart by said cylindrical element and clamped between the latter and said bolt-like member on the one hand and said threaded member on the other hand.

6. Apparatus as claimed in claim 5 wherein said stress responsive electrical element comprises a piezo-electric element adhesively secured between said bolt-like member and said indenter means and forming part of said moving assembly, said blade springs being electrically insulated from one another and in electrical connection with respective sides of said piezo-electric element.

References Cited
UNITED STATES PATENTS 3,421,364   1/1969   Moneypenny et al. _____ 73—82

JAMES J. GILL, Primary Examiner

E. J. KOCH, Assistant Examiner